United States Patent
MacKay

(10) Patent No.: US 8,788,681 B1
(45) Date of Patent: Jul. 22, 2014

(54) METHOD AND APPARATUS FOR AUTONOMOUSLY MANAGING A COMPUTER RESOURCE USING A SECURITY CERTIFICATE

(75) Inventor: Paul Fredrick MacKay, Provo, UT (US)

(73) Assignee: Symantec Corporation, Mountain View, CA (US)

( * ) Notice: Subject to any disclaimer, the term of this patent is extended or adjusted under 35 U.S.C. 154(b) by 499 days.

(21) Appl. No.: 12/197,325

(22) Filed: Aug. 25, 2008

(51) Int. Cl.
*G06F 15/16* (2006.01)

(52) U.S. Cl.
USPC .............................. 709/228; 726/4

(58) Field of Classification Search
USPC .................................. 709/226, 228
See application file for complete search history.

(56) References Cited

U.S. PATENT DOCUMENTS

| | | | | |
|---|---|---|---|---|
| 6,101,479 A * | 8/2000 | Shaw | | 705/7.12 |
| 6,901,446 B2 * | 5/2005 | Chellis et al. | | 709/226 |
| 6,947,989 B2 * | 9/2005 | Gullotta et al. | | 709/226 |
| 7,107,610 B2 * | 9/2006 | Lortz | | 726/4 |
| 7,185,364 B2 * | 2/2007 | Knouse et al. | | 726/8 |
| 7,630,480 B2 * | 12/2009 | Fleck et al. | | 379/201.12 |
| 7,707,623 B2 * | 4/2010 | Cicchitto et al. | | 726/4 |
| 8,190,682 B2 * | 5/2012 | Paterson-Jones et al. | | 709/205 |
| 8,250,213 B2 * | 8/2012 | Glover et al. | | 709/226 |
| 2002/0073308 A1 * | 6/2002 | Benantar | | 713/155 |
| 2002/0082858 A1 * | 6/2002 | Heddaya et al. | | 705/1 |
| 2002/0120744 A1 * | 8/2002 | Chellis et al. | | 709/226 |
| 2002/0144108 A1 * | 10/2002 | Benantar | | 713/156 |
| 2002/0169876 A1 * | 11/2002 | Curie et al. | | 709/226 |
| 2005/0267824 A1 * | 12/2005 | Hurewitz | | 705/30 |
| 2006/0212574 A1 * | 9/2006 | Maes | | 709/226 |
| 2006/0265490 A1 * | 11/2006 | Pishevar et al. | | 709/223 |
| 2009/0320037 A1 * | 12/2009 | Gokhale et al. | | 718/104 |

FOREIGN PATENT DOCUMENTS

EP 1881665 A1 1/2008

OTHER PUBLICATIONS

"Step 6: Certificate Enrollment and Device Provisioning," Microsoft TechNet, May 14, 2008.

* cited by examiner

*Primary Examiner* — Guang Li
(74) *Attorney, Agent, or Firm* — Wilmer Cutler Pickering Hale and Dorr LLP

(57) ABSTRACT

A method and apparatus for autonomously managing a computer resource using a security certificate is described. In one embodiment, the method includes identifying attribute information from secure communications within the computing environment, wherein the attribute information is associated with a trusted relationship and establishing at least one resource parameter for customizing the computer resource based on the attribute information.

20 Claims, 3 Drawing Sheets

US 8,788,681 B1

METHOD AND APPARATUS FOR AUTONOMOUSLY MANAGING A COMPUTER RESOURCE USING A SECURITY CERTIFICATE

BACKGROUND OF THE INVENTION

1. Field of the Invention

Embodiments of the present invention generally relates to an enterprise-level resource management system and, more particularly, to a method and apparatus for autonomously managing a computer resource using a security certificate without user intervention.

2. Description of the Related Art

An organization may employ several computing technologies in order to accomplish various mission critical operations within a computing environment. For example, a data protection system may be used to recover important data that has been corrupted or deleted. As another example, a cryptographic infrastructure (e.g., public-key infrastructure and/or the like) may be used to ensure secure communications (e.g., messages) between components of the computing environment (e.g., between a server and a client).

In any current computing environment, an administrator uses software to manage various computer resources (e.g., computing device, virtual machines, applications and/or the like). For example, the administrator may use software to configure the computer resources (e.g., set up an application or device with appropriate parameters such as language settings, operating system and/or the like). As another example, the administrator may use software to provision the computer resources (e.g., install an operating system on a bare-metal server in a datacenter).

Nonetheless, such software may employ a default profile for configuring or provisioning a particular computer resource. Accordingly, a user or the administrator must provide additional information in order to customize the particular computer resource. Such additional information may include information that identifies the user of the particular computer resource, such as a current location, a native language, a contact name, an organization, an email address and/or the like.

Therefore, there is a need in the art for a method and apparatus for autonomously managing a computer resource within a computing environment using attribute information that identifies a user associated with the computer resource and is exchanged during secure communications.

SUMMARY OF THE INVENTION

Embodiments of the present invention generally comprise a method and apparatus for autonomously managing a computer resource using a security certificate. In one embodiment, a method for autonomously managing a computer resource using leveraged trusted relationships within a computing environment comprises identifying attribute information from secure communications within the computing environment, wherein the attribute information is associated with a trusted relationship and establishing at least one resource parameter for customizing the computer resource based on the attribute information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
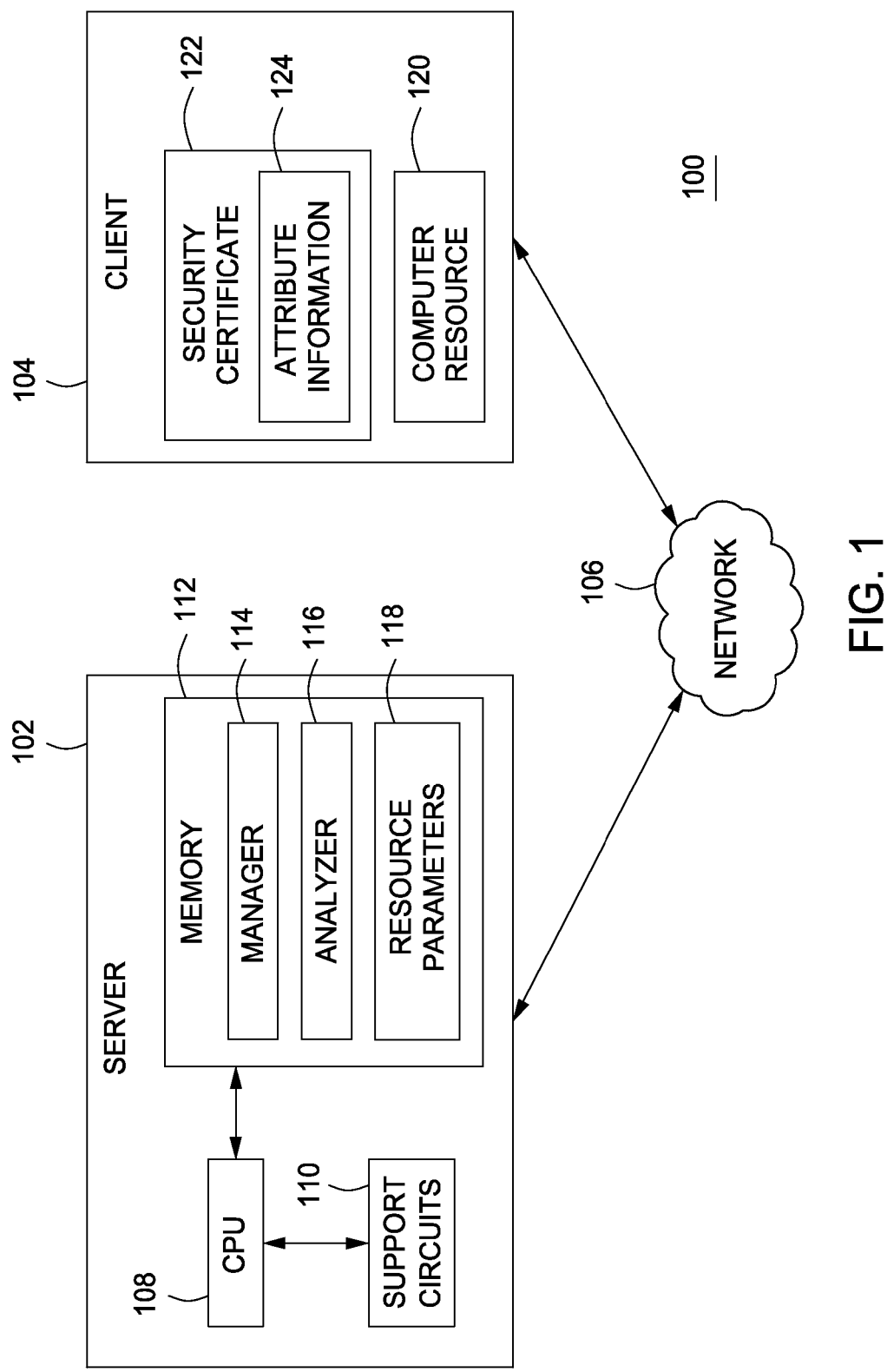
FIG. 1 is a system for autonomously managing a computer resource within a computing environment using leveraged trusted relationships according to one or more embodiments of the present invention.

FIG. 1 is a system 100 for autonomously managing a computer resource within a computing environment using leveraged trusted relationships according to one embodiment. The system 100 includes a server 102 and a client 104, where each is coupled to each other through a network 106. Furthermore, the system 100 may include a computing environment, such as a server cluster according to one embodiment.

A server 102 is a computing device (e.g., a laptop, a desktop, a Personal Desk Assistant (PDA), a tablet, a mobile phone and the like) that comprises a central processing unit (CPU) 108, various support circuits 110 and a memory 112. The CPU 110 may comprise one or more commercially available microprocessors or microcontrollers that facilitate data processing and storage. Various support circuits 110 facilitate operation of the CPU 110 and may include clock circuits, buses, power supplies, input/output circuits and/or the like. The memory 112 includes a read only memory, random access memory, disk drive storage, optical storage, removable storage, and the like. The memory 112 includes various software packages, such as a manager 114 and an analyzer 116 as explained further below. The memory 112 further includes various data, such as one or more resource parameters 118 as explained further below.

A client 104 is a computing device (e.g., a laptop, a desktop, a Personal Desk Assistant (PDA), a tablet, a mobile phone and the like) that may be used to access various services hosted by the server 102. The client 104 includes a computer resource 120 and a security certificate 122 according to one embodiment. The computer resource 120 may be a device resource, such as a physical computing device (e.g., a physical machine and a virtual machine), one or more data storage devices (e.g., a RAID array), a networking component (e.g., a gateway) and/or the like. The computer resource 120 may also be an application resource, such as an operating system, a database, e-mail server, data protection and/or management software and/or the like.

The security certificate 122 may be a digital certificate, such as a X.509 version three certificate. The security certificate 122 may indicate a public key that is bound to the client 104 (e.g., an entity of the trusted relationship, such as a user of the client 104) and issued by a certificate authority in order to form a trusted relationship and provide secure communications between the client 104 and the server 102. The security certificate 122 may be transmitted within secure communications between the client 104 and the server 102. Alternatively, the client 104 and the server 102 may engage in secure communications through a mechanism that does not use a digital certificate. As such, the attribute information 124 is communicated to the server 102 without the digital certificate.

The security certificate 122 may be installed on the client 104 by the original equipment manufacturer (OEM) or the user. Alternatively, the security certificate 122 may be entered directly into the Basic Input/Output System (BIOS). Furthermore, the security certificate 122 includes attribute information 124 that describes the trusted relationship. The attribute information 124 may include data fields for several attributes such as subject, a version, an algorithm identifier, an issuer and/or the like. In addition, the subject attribute of the attribute information 124 identifies an entity of the trusted relationship (e.g., an employee to which the security certificate 122 issued) according to one embodiment.

Within a typical public-key Infrastructure, the certificate authority creates a public key and a private key using a public key cryptology algorithm and binds the public key to a user with a unique identity. The private key may be stored locally on a computer associated with the user. Generally, data encrypted with the private key can only be decrypted with the corresponding public key and vice versa. Hence, a server that desires to authenticate the user can use the public key to verify a digital certificate that is signed with the private key. Once authenticated, the user and the server proceed to securely communicate data with each other.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

According to one or more embodiments, the manager 114 and the analyzer 116 cooperate to configure or provision the computer resource 120 using the resource parameters 118. Accordingly, the manager 114 and the analyzer 116 customize the computer resource 120 without additional information provided from the user. In operation, after the security certificate 122 is transmitted during secure communications between the server 102 and the client 104, the analyzer 116 identifies the attribute information 124 and establishes the resource parameters 118. Once the computer resource 120 becomes accessible, the manager 114 uses the resource parameters 118 to customize the computer resource 120 for the client 104 without user intervention.

The manager 114 may include resource management software that provides a configuration or provisioning service for the computing environment according to one or more embodiments. For example, the manager 114 may provision a server within a server cluster by installing appropriate operating system and application software. Subsequently, the server becomes accessible to the server cluster. Furthermore, the manager 114 may configure the server by setting a language (e.g., English), a location (e.g., a city and state) and credentials (e.g., a full name, an email address, an employee ID and/or the like) associated with the user (e.g., a user of a user group, an administrator, an entity within the organization and/or the like).

According to one or more embodiments, the analyzer 116 may include software code for identifying the attribute information 122 from the security certificate 122. In one embodiment, the analyzer 116 recognizes a data field for an attribute. For example, the analyzer 116 recognizes the subject data field as an attribute that includes information regarding the identity of the client 104 (e.g., subject of the security certificate 122), such as a location, an email address, a username, a password, a language and/or the like. Then, the analyzer 116 accesses the subject attribute and establishes the resource parameters 118 using the information regarding the identity of the client 104. For example, one or more location parameters are determined from the subject attribute, which indicates a city, a state, a country and/or an organization of the user of the client 104 (i.e., the subject of the security certificate 122).

The resource parameters 118 include data that may be used to customize the computer resource 120. According to one or more embodiments, the resource parameters 118 may include one or more location parameters (e.g., city, state, a country and/or an organization), personalization parameters (e.g., a unique identifier for the user of the client 104), notification parameters (e.g., an email address, a phone number and/or the like), language parameters (e.g., a native language) and/or organizational parameters (e.g., applications) for customizing the computer resource 120 during a configuration or a provisioning process. For example, the language parameters indicate the language (e.g., English) to be used while interacting with the computer resource 120.

In one embodiment, the resource parameters 118 may be used to configure or set up the computer resource 120 for operation within the computing environment. In addition, the resource parameters 118 may indicate one or more software programs (e.g., patches, add-ons, updates, software applications, operating systems and/or the like) or files (e.g., registry settings, database files and/or the like) to be installed on the computer resource 120. Furthermore, the resource parameters 118 may be used to provide access to the computer resource 120 for one or more computing devices within the computing environment. Hence, the resource parameters 118 enable immediate accessibility to the computer resource 120.

For example, the computer resource 120 may be an application resource (e.g., an ORACLE database application and/or the like) that is customized using the language parameter (e.g., English), the location parameter (e.g., Salt Lake City, Utah) and/or the personalization parameter of the user of the client 104 (e.g., jane_doe@organization.com). In one embodiment, any data (e.g., computing results, log files, user interface information and/or the like) produced by the application resource is presented in the English language. In another embodiment, the server 102 installs an English language version of the application resource on the client 104. In yet another embodiment, jane_doe@organization.com is used as the contact email address for any notifications.

As another example, the computer resource 120 may be a device resource (e.g., a virtual machine, a physical computer, data storage and/or the like) that is customized using the language parameter (e.g., English), the location parameter (e.g., Salt Lake City, Utah) and/or the personalization parameter of the user of the client 104 (e.g., jane_doe). In one embodiment, the virtual machine is provisioned with English language versions of an operating system and application software. In another embodiment, the physical computer is configured with the location of Salt Lake City, Utah. As such, the physical computer operates on local time. The unique identifier "jane_doe" may also be used to create an email address "jane_doe@organization.com" and configure email software on the physical computer. The unique identifier "jane_doe" may also be used to identify the physical computer within a user group. In yet another embodiment, the physical computer is provisioned to be a MICROSOFT Exchange server in a server cluster; the location of Salt Lake City is used to determine an appropriate server cluster for load-balancing, network efficiency or disaster recovery.

In one embodiment, when a physical computer with INTEL vPro AMT technology is initially connected to the network 106, a secure channel for enabling secure communications with the server 102 is initiated. At this time, attribute information that identifies a user of the physical computer (i.e., the security certificate 122) is communicated to the server 102 through the secure channel. As explained herein, authentication of a user of the physical computer (e.g., verification of a digital certificate) forms a trusted relationship between the physical computer and the server 102.

In another embodiment, the physical computer may be provisioned with application software that is germane to the organization. The resource parameters 118 (e.g., organizational parameters and/or the location parameters) identify the organization (e.g., company name, industry and/or the like) as well as indicate one or more applications currently being used by the organization. Accordingly, the server 102 may install the one or more applications indicated by the organizational parameters. In addition, the server 102 may install one or more applications that are specific to particular location. Alternatively, the server 102 may install one or more applications based on the company name or organization type. For example, the server 102 may install productivity software on a computer in a marketing company and design software on a computer in an engineering firm.

Figure 2:
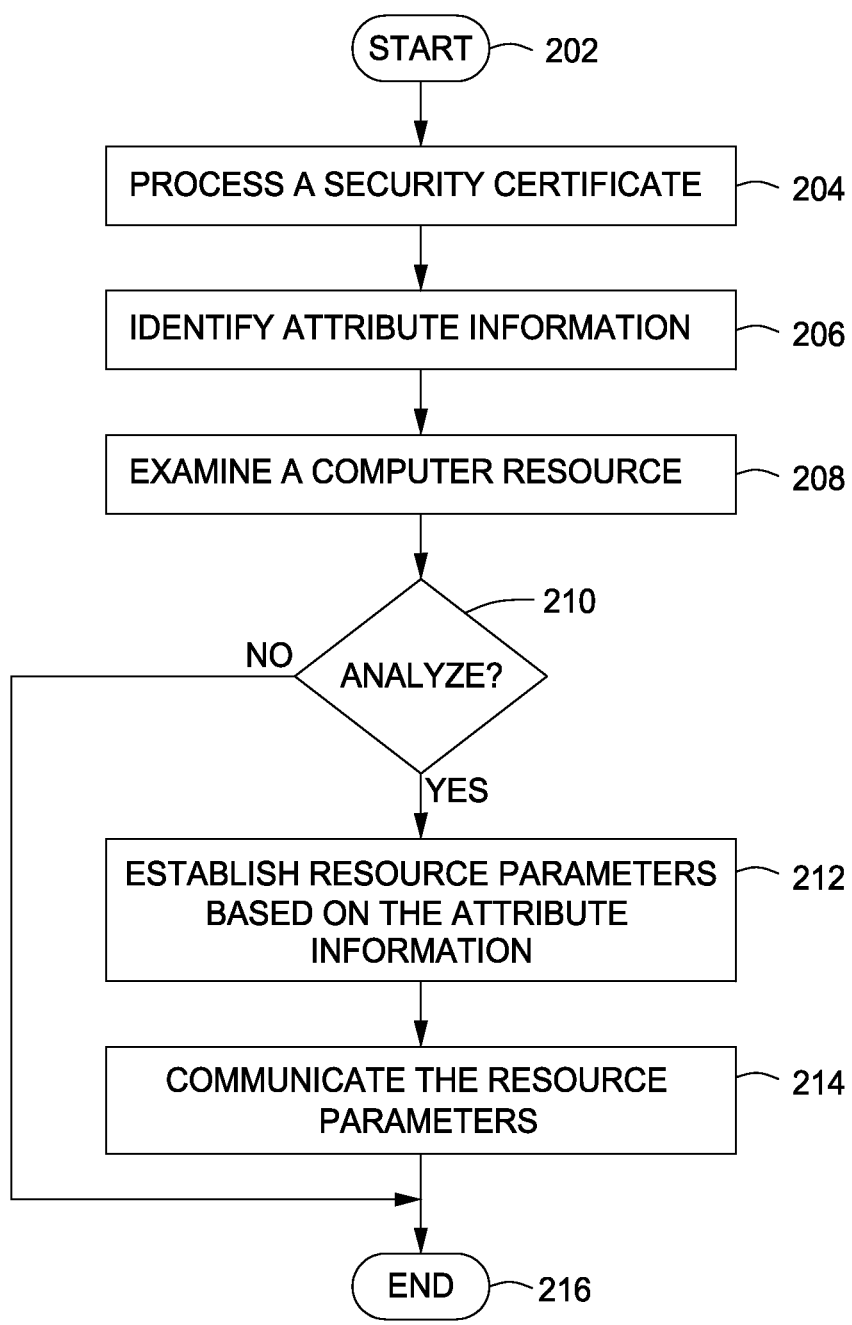
FIG. 2 is a method for determining resource parameters for customizing a computer resource according to one or more embodiments of the present invention.

FIG. 2 is a method 200 for determining resource parameters for customizing a computer resource according to one embodiment. The method 200 starts at step 202 and proceeds to step 204 where a security certificate (e.g., the security certificate 122 of FIG. 1) is processed.

At step 206, attribute information is identified. As explained herein, the attribute information identifies a subject (e.g., a user) that was issued the security certificate. At step 208, the computer resource (e.g., the computer resource 120 of FIG. 1) is examined. In one embodiment, environmental settings for the computer resource are examined in order to determine the type of a particular computer resource. At step 210, a determination is made as to whether the attribute information is to be analyzed. If the attribute information is to be analyzed in order to determine the resource parameters, the method 200 proceeds to step 212. If the attribute information is not to be analyzed, the method 200 proceeds to step 216 where the method 200 ends.

At step 212, the resource parameters are established based on the attribute information. As explained herein, the resource parameters are used to configure or provision the computer resource according to one or more embodiments. At step 214, the resource parameters are communicated. In one embodiment, the resource parameters are communicated to a provisioning service. Alternatively, the resource parameters are stored in memory. At step 216, the method 200 ends.

Figure 3:
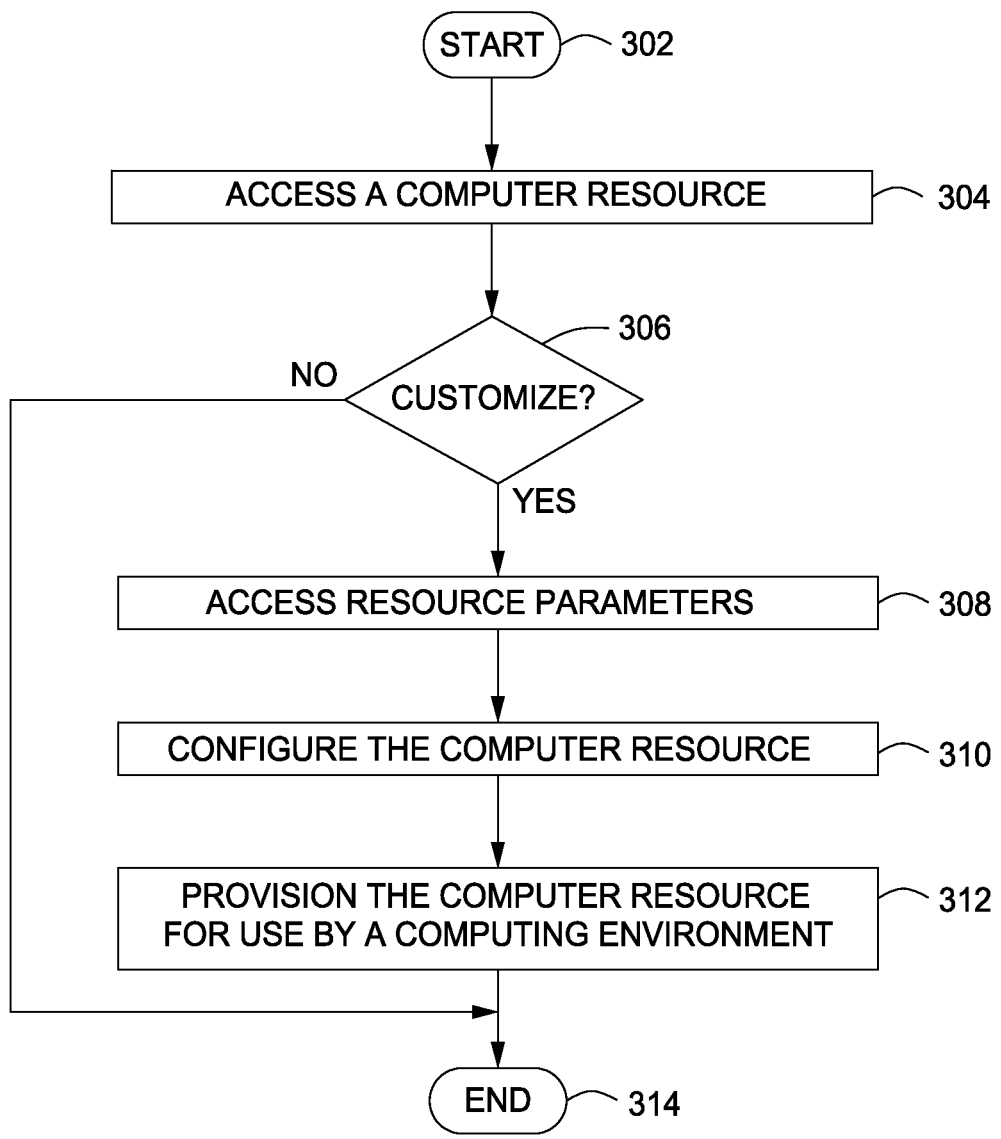
FIG. 3 is a method for autonomously managing a computer resource within a computing environment according to one or more embodiments of the present invention.

FIG. 3 is a method 300 for autonomously managing a computer resource within a computing environment according to one or more embodiments of the present invention. The method 300 starts at step 302 and proceeds to step 304 where the computer resource is accessed.

At step 306, a determination is made as to whether the computer resource is to be customized without user intervention. If the computer resource is to be customized, the method 300 proceeds to step 308. If the computer resource is not to be customized, the method 300 proceeds to step 314 where the method 300 ends. At step 308, the resource parameters are accessed. At step 310, the computer resource is configured using the resource parameters. At step 312, the computer resource is provisioned for use within the computing environment. At step 314, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for autonomously managing a computer resource using leveraged trusted relationships within a computing environment, comprising:
    extracting, at least one computer processor, attribute information, including at least a location parameter, from a security certificate within the computing environment, wherein the attribute information is associated with a trusted relationship;
    establishing at least one resource parameter based on the attribute information, wherein the at least one resource parameter indicates a type of organization associated with the computer resource;
    determining that the computer resource is to be customized without user intervention; and
    provisioning the computer resource with resources based on the type of organization associated with the computer resource.

2. The method of claim 1, wherein the attribute information describes an entity of the trusted relationship.

3. The method of claim 1, wherein provisioning the computer resource further comprises provisioning the computer resource for a plurality of computers in the computing environment using the at least one resource parameter.

4. The method of claim 1, wherein provisioning the computer resource further comprises installing software on the computer resource based on the at least one resource parameter.

5. The method of claim 1, wherein provisioning the computer resource further comprises configuring the computer resource using the at least one resource parameter.

6. The method of claim 1, wherein establishing the at least one resource parameter further comprises analyzing the attribute information to determine the at least one resource parameter.

7. The method of claim 1, wherein the security certificate comprises a X.509 certificate.

8. An apparatus for autonomously managing a computer resource using leveraged trusted relationships within a computing environment, comprising:
    a memory comprising a security certificate, wherein the security certificate comprises attribute information, wherein the attribute information identifies an entity of a trusted relationship;
    an analyzer for extracting at least one resource parameter, including at least a location parameter, from the security certificate based on the attribute information and determining that the computer resource is to be customized without user intervention, wherein the at least one resource parameter indicates a type of organization associated with the computer resource; and
    a manager for provisioning the computer resource with resources based on the type of organization associated with the computer resource.

9. The apparatus of claim 8 wherein the manager applies the at least one resource parameter to the computer resource.

10. The apparatus of claim 9, wherein the manager configures the computer resource using the at least one resource parameter.

11. The apparatus of claim 9, wherein the manager provisions the computer resource for the computing environment using the at least one resource parameter.

12. The apparatus of claim 9, wherein the manager installs software on the computer resource based on the at least one resource parameter.

13. The apparatus of claim 8, wherein the computer resource comprises at least one of an application resource or a device resource.

14. The apparatus of claim 8, wherein the analyzer processes the attribute information to determine the at least one resource parameter.

15. A system for autonomously managing a computer resource using leveraged trusted relationships within a computing environment, comprising:
 a client for communicating a security certificate that includes attribute information that identifies an entity of a trusted relationship;
 a server, comprising:
  an analyzer for extracting the attribute information, including at least a location parameter, from the security certificate, determining at least one resource parameter based upon the attribute information extracted from the security certificate, and determining that the computer resource is to be customized without user intervention, wherein the at least one resource parameter indicates a type of organization associated with the computer resource; and
  a manager for provisioning the computer resource with resources based on the type of organization associated with the computer resource.

16. The system of claim 15, wherein the entity comprises a user of the client, wherein the security certificate is issued to the user.

17. The system of claim 15 wherein the manager applies the at least one resource parameter to the computer resource.

18. The system of claim 16, wherein the manager configures the computer resource using the at least one resource parameter.

19. The system of claim 16, wherein the manager provisions the computer resource for the computing environment using the at least one resource parameter.

20. The system of claim 16, wherein the manager installs software on the client to provision the client as a server within the computing environment.

* * * * *